United States Patent
Bellala et al.

(10) Patent No.: US 10,536,437 B2
(45) Date of Patent: Jan. 14, 2020

(54) PERFORMING PRIVACY-PRESERVING MULTI-PARTY ANALYTICS ON VERTICALLY PARTITIONED LOCAL DATA

(71) Applicant: HEWLETT PACKARD ENTERPRISE DEVELOPMENT LP, Houston, TX (US)

(72) Inventors: Gowtham Bellala, Redwood City, CA (US); Shagufta Mehnaz, West Lafayette, IN (US)

(73) Assignee: Hewlett Packard Enterprise Development LP, Houston, TX (US)

(*) Notice: Subject to any disclaimer, the term of this patent is extended or adjusted under 35 U.S.C. 154(b) by 88 days.

(21) Appl. No.: 15/421,041

(22) Filed: Jan. 31, 2017

(65) Prior Publication Data

US 2018/0219842 A1 Aug. 2, 2018

(51) Int. Cl.
*H04L 29/06* (2006.01)
*H04W 12/02* (2009.01)
(Continued)

(52) U.S. Cl.
CPC .......... *H04L 63/0428* (2013.01); *H04L 67/12* (2013.01); *H04W 4/70* (2018.02); *H04W 12/02* (2013.01)

(58) Field of Classification Search
CPC ..... G06F 19/22; G06F 19/28; H04L 2209/46; H04L 2209/24; H04L 2209/50; H04N 7/181
See application file for complete search history.

(56) References Cited

U.S. PATENT DOCUMENTS 6,708,163 B1 3/2004 kargupta et al.
7,836,090 B2 11/2010 Perrizo et al.
(Continued)

FOREIGN PATENT DOCUMENTS

WO WO-2015131394 9/2015

OTHER PUBLICATIONS

Omer et al., "Privacy Preserving in Distributed SVM Data Mining on Vertical Partitioned Data" 2016 3rd International Conference on Soft Computing & Machine Intelligence (Year: 2016).*
(Continued)

*Primary Examiner* — Taghi T Arani
*Assistant Examiner* — Lin Chang
(74) *Attorney, Agent, or Firm* — Hewlett Packard Enterprise Patent Department (57) ABSTRACT

Example computing devices described herein enable computation of a machine learning model on distributed multi-party data that is vertically partitioned, in a privacy preserving fashion. The computing device computes at a party a sum of local data owned by the party, wherein the local data is vertically partitioned into a plurality of data segments, each data segment representing a non-overlapping subset of data features; transforms a cost function of a data analytics task to a gradient descent function, wherein the cost function comprises a summation of a plurality of cost function values; anonymizes aggregated data shards received from a mediator; updating local model parameters based on the aggregated data shards; and performs privacy-preserving multi-party analytics on the vertically partitioned local data based on a learned global analytic model. It leverages a secure-sum protocol that provides strong security guarantees against collusion and prior-knowledge attacks.

18 Claims, 4 Drawing Sheets

(51) Int. Cl.
  *H04L 29/08* (2006.01)
  *H04W 4/70* (2018.01)

(56) References Cited

U.S. PATENT DOCUMENTS

| | | | |
|---|---|---|---|
| 8,249,250 | B2 | 8/2012 | Rane et al. |
| 8,893,292 | B2 | 11/2014 | Wang et al. |
| 9,548,861 | B2* | 1/2017 | Isshiki .................. H04L 9/3073 |
| 9,961,141 | B1 | 5/2018 | Allard et al. |
| 9,998,539 | B1 | 6/2018 | Brock et al. |
| 2005/0021488 | A1 | 1/2005 | Agrawal et al. |
| 2010/0017870 | A1 | 1/2010 | Kargupta |
| 2012/0201378 | A1 | 8/2012 | Nabeel et al. |
| 2013/0047230 | A1 | 2/2013 | Krishnan et al. |
| 2016/0154999 | A1 | 6/2016 | Fan et al. |
| 2016/0306854 | A1 | 10/2016 | Hegde et al. |
| 2017/0103116 | A1 | 4/2017 | Hu et al. |
| 2017/0116520 | A1* | 4/2017 | Min ..................... G06N 3/0454 |

OTHER PUBLICATIONS

Amirbekyan, A. et al; The privacy of k-NN retrieval for horizontal partitioned data—new methods and applications; http://crpit.com/confpapers/CRPITV63Amirbekyan.pdf; 2015; 10 pages.

Banerjee, et al; A generic and distributed privacy preserving classification method with a worst-case privacy guarantee; http://userpages.umbc.edu/~zhchen/papers/generic.pdf; May 1, 2013; 31 Pages.

Biswas; A.S.et al; Privacy Preserving K-means Clustering; https://courses.csail.mit.edu/6.857/2016/files/8.pdf; May 11, 2016; 10 pages.

Gascon, et al; Secure Linear Regression on Vertically Partitioned Datasets; https://eprint.iacr.org/2016/892.pdf; Retrieved Jan. 20, 2017; 27 pages.

Gupta, M. ; An Enhanced CART Algorithm for Preserving Privacy of Distributed Data and Provide ; http://www.ijritcc.org/download/1450765532_22-12-2015.pdf ; International Journal on Recent and Innovation Trends in Computing and Communication ISSN: 2321-8169 vol. 3 Issue: 12; Dec. 2015; 5 pages.

Murdopo, A. et al ; Distributed Decision Tree Learning for Mining Big Data Streams; http://people.ac.upc.edu/leandro/emdc/arinto-emdc-thesis.pdf; Jul. 2013; 75 pages.

Prakash, et al; Privacy Preserving Data Mining Using Secure Multiparty Computation; http://ijcsiet.com/pdf/01092013-006.pdf ; 2008, retrieved Jan. 20, 2017; 5 pages.

Viadya, J. et al; Leveraging the "Multi" in Secure Multi-Party Computation; https://pdfs.semanticscholar.org/eafd/157850c5b45d2cb124bea2d44c1fbb8ab0d3.pdf; Oct. 30, 2003; 7 pages.

Yigzaw, K.Y. et al; Secure and Scalable Deduplication of Horizontally Partitioned Health Data for Privacy-preserving Distributed Statistical Computation; http://westminsterresearch.wmin.ac.uk/18150/1/2016-BMC%20-%20Secure_Scalable_Deduplication.pdf; 2017; 19 pages.

Yu et al., "Privacy-preserving svm classification on vertically partitioned data", In Proceedings of the 10th Pacific-Asia conference on Advances in Knowledge Discovery and Data Mining, 2006, pp. 647-656.

Vaidya et al., "Privacy-preserving decision trees over vertically partitioned data", ACM Transactions on Knowledge Discovery from Data (TKDD), vol. 2, No. 3, 2008, Article 14, 27 pages.

Vaidya et al., "Privacy preserving association rule mining in vertically partitioned data", In Proceedings of the 8th ACM SIGKDD International conference on Knowledge Discovery and Data Mining, 2002, pp. 639-644.

Popa et al., "Cryptdb: Protecting confidentiality with encrypted query processing", In Proceedings of the 23rd ACM Symposium on Operating Systems Principles (SOSP), 2011, pp. 85-100.

Paul Ohm, "Broken promises of privacy: Responding to the surprising failure of anonymization", UCLA Law Review, 2010, pp. 1701-1777.

Narayanan et al., "Robust de-anonymization of large sparse datasets", In Proceedings of the 2008 IEEE Symposium on Security and Privacy, 2008, pp. 111-125.

Narayanan et al., "Privacy and security: Myths and fallacies of personally identifiable information", ACM Communications, vol. 53, Issue 8, 2010, pp. 24-26.

Narayanan et al., "De-anonymizing social networks", In Proceedings of the 2009 IEEE Symposium on Security and Privacy, 2009, pp. 173-187.

Mangasarian et al., "Privacy-preserving classification of vertically partitioned data via random kernels", ACM Transactions on Knowledge Discovery from Data (TKDD), vol. 2, Issue 3, 2008, Article No. 12.

Liu et al., "A survey of attack techniques on privacy-preserving data perturbation methods", Privacy-Preserving Data Mining, vol. 34, No. 1, 2008, pp. 359-381.

Lindell et al., "Secure multiparty computation for privacy-preserving data mining", Journal of Privacy and Confidentiality, vol. 1, No. 1, 2009, 39 pages.

Kargupta et al., "On the privacy preserving properties of random data perturbation techniques", In ICDM, 2003, available online at <https://www.eecs.wsu.edu/~siva/icdm03.pdf>, 8 pages.

Jeff Goldman, "Third-Party Vendors a Weak Link in Security Chain", eSecurityPlanet, available online at <https://www.esecurityplanet.com/network-security/third-party-vendors-a-weak-link-in-security-chain.html>, Mar. 6, 2015, 8 pages.

J. Vaidya. Privacy preserving data mining over vertically partitioned data. PhD thesis, Purdue University, 2004, 162 pages.

Huang et al., "Deriving private information from randomized data", SIGMOD '05 Proceedings of the 2005 ACM SIGMOD international conference on Management of data, 2005, pp. 37-48.

Gentry et al., "A fully homomorphic encryption scheme", PhD thesis, Stanford University, 2009, available online at <https://crypto.stanford.edu/craig/craig-thesis.pdf>, 209 pages.

Aggarwal et al., "A general survey of privacy-preserving data mining models and algorithms", Springer, 2008, pp. 11-52.

* cited by examiner

PERFORMING PRIVACY-PRESERVING MULTI-PARTY ANALYTICS ON VERTICALLY PARTITIONED LOCAL DATA

BACKGROUND

Sometimes, multiple parties, each owning some data, want to collaborate with each other while preserving the privacy of their own data in the meantime. The data may be vertically partitioned across the multiple parties. That means that each party has different features or attributes (columns) of data for the same set of data entities (rows). As an example, consider a healthcare scenario where hospitals have data corresponding to their patients' demographics, biometrics and medications, while information about patients' fitness activity or diet habits are available through other parties (such as, wearable service providers, health app providers, etc.). Having access to the entire data would significantly improve the quality of data analysis and models built, as data from each party provides different information about the data entities. However, privacy concerns prohibit the parties from sharing their data with each other. Conventional solutions either target a particular analytical task and thus cannot be applied to generic analytical tasks, or assume two parties when applicable to generic analytical tasks with increased computational complexity when the number of parties is more than two. Hence, it is difficult to scale these conventional solutions to big data analytics and generic analytical tasks in a privacy-preserving manner, especially when more than two parties participate in the communications.

BRIEF DESCRIPTION OF THE DRAWINGS

The following detailed description references the drawings, wherein.

DETAILED DESCRIPTION

In the following description, details are presented to provide a detailed description. Concepts and techniques disclosed herein can be practiced without one or more of the specific details, or in combination with other components, etc. As used herein, the term "implementation" generally refers to an implementation that serves to illustrate by way of example but not limitation. It should be understood that this disclosure covers all modifications, equivalents, and alternatives falling within the spirit and scope of the present disclosure.

One challenge in data-driven enterprises is how to extract information from a dataset that can facilitate good business decisions, without sacrificing the privacy of the individuals or organizations whose sensitive details may be contained in the dataset. This challenge is compounded when the analysis involves multiple parties (or organizations) which want to collaborate with each other in order to obtain a broader understanding of a topic of mutual interest.

For example, a group of hospitals may want to work together to improve their collective quality of healthcare. Each hospital may have collected a lot of data about its own patients, including their demographics, past medical history, lab results, current diagnosis, prescribed treatment and outcomes, etc. This data contains a lot of information that, if shared across the group, could mutually benefit parties in the group, allowing faster diagnosis and effective treatment for similar cases. However, this data also contains sensitive and private information both about the patients and about the hospitals. Thus, sharing this sort of data can be difficult due to privacy and regulatory reasons.

In general, this class of scenarios arises when a dataset containing private information belongs to multiple parties, and the parties collectively want to perform analytics on the entire dataset while respecting the privacy and security concerns of each individual party. For example, consider a healthcare scenario where hospitals typically have data corresponding to patients' demographics, biometrics and medications, while information about patients' fitness activity or patients' food habits are available with other parties, such as, wearable service providers, health application providers, etc. Having access to the entire data would significantly improve the quality of models built, as data from each party provides different information about the entities. This scenario may occur in a variety of applications ranging from healthcare to the Internet-of-things (IoT).

The complexity of privacy-preserving analytics is greatly increased due to the vertical partitioning of data. In contrast to horizontal partitioning of data, vertical partitioning raises several unique questions with respect to the way data is processed, results are obtained and shared.

Specifically, two questions and assumptions are discussed below. First, in problems like classification and regression analysis, there is a dependent variable y, e.g., the variable to be modeled. One question that arises is the location of this dependent variable y. There are two possibilities—the dependent variable y may be known to all parties, or it may be private and belong to a particular party. This impacts how the model is built and evaluated. Both cases are realistic and can model different situations. In this disclosure, it is assumed that the dependent variable y is known to all parties. The second question is regarding how the final model is shared between parties. For example, one possibility is to let all parties know the developed model. However, this may reveal too much information and fail to respect the privacy constraints. An alternate fully secure solution may be to split the model between the parties. In this disclosure, the latter and secured approach is adopted, but it can be easily extended to the former approach. Specifically, the model may be split between parties, where each party has model parameters for the subset of features that it owns. However, the downside to this approach is that a secure protocol has to be run each time the model needs to be used on a new data point.

In some examples where this performance penalty is undesirable, the former approach can be used by sharing the global model with all parties at the end of the disclosed secure optimization protocol.

Finally, an honest-but-curious (or semi-honest) adversary model is assumed. In the honest-but-curious adversary model, each participating entity (either an untrusted mediator or a party) or an adversary can be curious and attempt to learn from the information received during the protocol, but cannot deviate from the protocol. Honest-but-curious adversaries generally are considered a realistic assumption in many relevant scenarios. Moreover, it is assumed that the parties and/or the mediator may attempt to collude to extract private information. The disclosed framework herein can be secure under the honest-but-curious model, and can also be secure to any collusion attacks as long as there are at least two honest parties.

Existing solutions often either target a particular analytical task and thus cannot be applied to generic analytical tasks, or assume two parties when applicable to generic analytical tasks with increased computational complexity when the number of parties is more than two. Hence, it is difficult to scale these conventional solutions to big data analytics and generic analytical tasks, especially when more than two parties participate in the communications. The solution disclosed herein can be used on real world datasets for a variety of analytical use cases.

The solution described herein generally applies to a setting where there are multiple parties, for example, more than two parties, that are willing to collaborate and the data is vertically partitioned across the multiple parties. This means each party owns a subset of attributes (or columns) for data entries (rows). For example, consider a healthcare scenario where multiple hospitals are willing to collaborate. Each hospital has some data about its patients. Table 1 below shows an example of vertically partitioned data between two parties.

TABLE 1

| Heart rate ($x_1$) | Calcium score ($x_2$) | Length of hospital stay (y) |
|---|---|---|
| 78 | 408 | 20 |
| 72 | 159 | 8 |
| 89 | 211 | 13 |
| 77 | 190 | 9 |

In the example illustrated in Table 1, the first data feature (e.g., the first column) is proprietary patient data owned by a wearable heath device provider and the next two data features (e.g., the second and third columns) are proprietary patient data owned by a hospital. Note that both the data set from the wearable health device provider and the data set from the hospital include identical rows. Also, both data sets have non-overlapping data features. Therefore, the combined data set is referred to as being vertically partitioned. Each partition of the combined data set corresponds to a subset of data features owned by a particular party, whereas the subset of data features share the same rows as other data features owned by other parties but does not have any overlapping data columns.

Figure 1A:
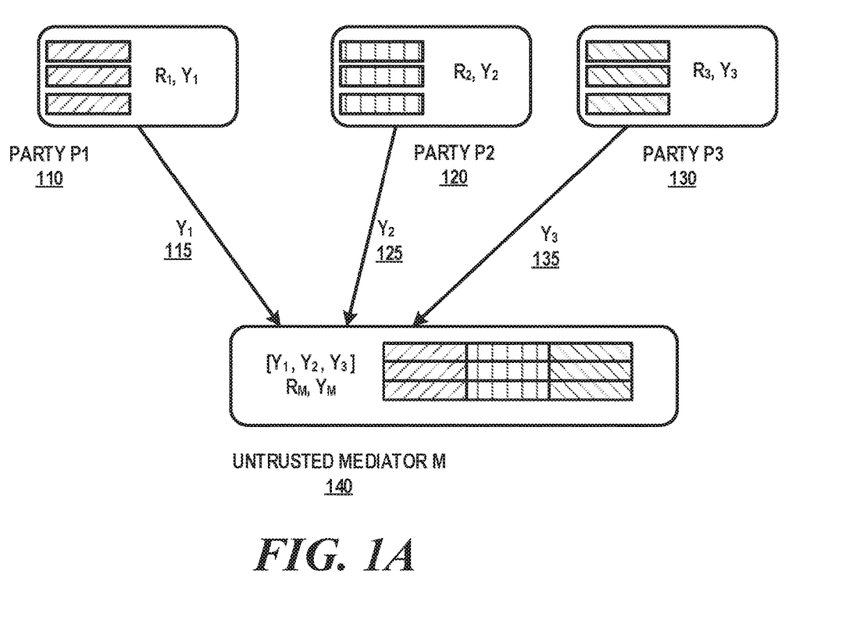
FIGS. 1A-1B are block diagrams of an example threat model and secure protocol used by multiple parties and a non-trusted mediator to perform privacy-preserving multi-party analytics on vertically partitioned local data.
Figure 1B:
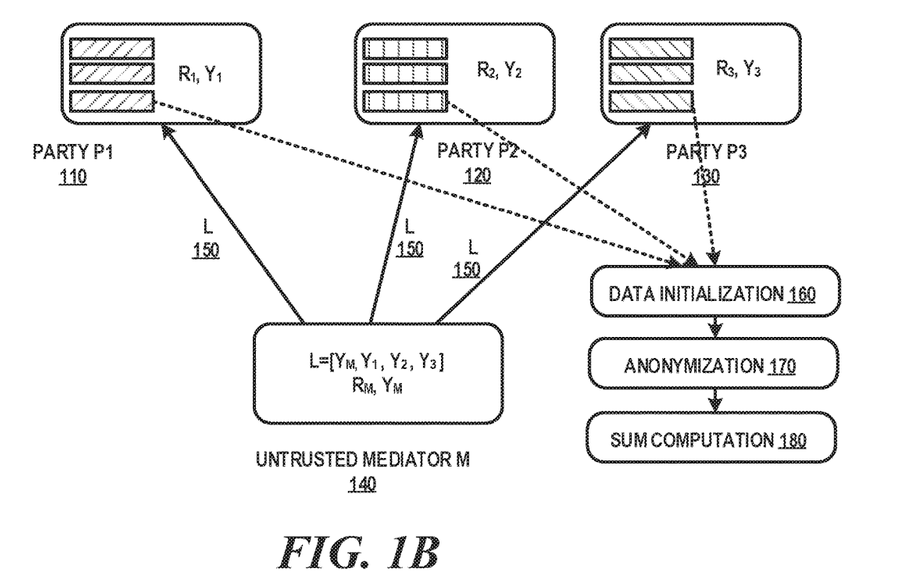

FIGS. 1A-1B are block diagrams of an example threat model and secure protocol used by multiple parties and a non-trusted mediator to perform privacy-preserving multi-party analytics on vertically partitioned local data.

In this example, the threat model involves an honest but curious (e.g., semi-honest) adversary model rather than a malicious model. Under the malicious threat model, parties may commit malicious acts, for example, sending incorrect information when collaborating with other parties. By contrast, under the honest but curious mode, a party will follow the protocol without malicious behaviors, but may try to acquire as much information as possible about other parties' private data during the computation. Thus, it is possible for a party to commit non-malicious attacks, such as, collusion attacks.

The collusion-resistant data anonymization may be achieved by randomly permuting the data (or segments of the data) submitted by the multiple parties. This anonymization provides that the mediator along with the colluding semi-honest parties cannot breach an honest party's data anonymity as long as the adversary has control over at most (N−2) parties.

FIGS. 1A-1B include a non-trusted mediator 140 and multiple parties, such as, party P1 110, party P2 120, and party P3 130. In this example, each party (P1 110, P2 120, or P3 130) has its own private data, e.g., a value that may be a vector including multiple dimensions. The goal of the computation is to seek a sum of the values from the three parties P1 110, P2 120, and P3 130.

First, each party P1 110, P2 120, P3 130, and the non-trusted mediator M 140 generates a pair of keys, including a public key Y and a private key R. Each party may share its public keys with the non-trusted mediator and other parties, but may store its private key such that the private key is only known to the party creating the key. As illustrated in FIG. 1A, P1 110 generates a public key $Y_1$ and a private key $R_1$; P2 120 generates a public key $Y_2$ and a private key R2; and, P3 130 generates a public key $Y_3$ and a private key R3. Furthermore, P1 110, P2 120, and P3 130 may share with non-trusted mediator M 140 their respective public key $Y_1$ 115, $Y_2$ 125, and $Y_3$ 135.

Similarly, non-trusted mediator M 140 also creates a private key $R_M$ and a public key $Y_M$. Also, non-trusted mediator M 140 may store the private key $R_M$ in a place accessible only to itself. After receiving the public keys from the parties participating in the collaboration, non-trusted mediator M 140 can generate a collection of public keys L=[$Y_M$, $Y_1$, $Y_2$, $Y_3$] 150, and can share L with each participating party (e.g., parties P1 110, P2 120, and P3 130).

Under a secure sum protocol, each party divides its own data (e.g., a value) into multiple data segments, which are represented by the shaded blocks in FIGS. 1A-1B. The segmented data may be encrypted using at least one public key from L 150 before being shared with other parties and/or non-trusted mediator 140. Under the protocol described herein, parties generally do not transmit data to another party (P1 110, P2 120, or P3 130) or non-trusted mediator M 140 without any encryption. Data from each party may generally go through three distinct phases under the secure protocol that involves at least data initialization 160, anonymization 170, and sum computation 180.

In the data initialization phase 160, each party can prepare its data for submission to the non-trusted mediator. This phase includes at least two operations: The first operation involves sharding the data into a number of segments. The second operation involves recursively encrypting the data segments with the public keys of mediator M 140 and the multiple parties (assuming N parties).

In the anonymization phase 170, the mediator M 140 sends the set of prepared data to the Nth party (e.g., party P3 130). Here, the Nth party indicates the party to which the last shared public key belongs to. Then, the Nth party can perform decryption, shuffle on the prepared data set and send randomly shuffled data to the (N−1)th party (e.g., party P2 120). The (N−1)th party can then further decrypt and shuffle the data segments, and this process continues until the data is decrypted and shuffled by the 1st party (e.g., party P1 110). Finally, the mediator M 140 receives anonymized data from the 1st party (e.g., P1 110) with only one layer of encryption using the mediator M 140's public key.

As used herein, "shuffling on the prepared data set" generally involves randomly rearranging the order of data segments within the prepared data set. As used herein, "anonymizing data" generally refers to removing identifying attributes from the data, for example, by reordering and/or encrypting the data that were owned by multiple participating parties. As used herein, a "party" generally refers to a data entity as represented by at least one computing device hosting a private data set. As used herein, a "mediator" generally refers to a non-trusted entity as represented by at least one computing device to which each participating party is willing to share its data set in an encrypted form. Note that because the "mediator" here is a non-trusted entity, parties will not share their private data set with the mediator in plain text form.

In sum computation phase 180, the mediator M 140 decrypt the data segments using its own secret key and computes the sum of the values from the N parties. Then, the mediator M 140 can share the sum with the N parties (e.g., P1 110, P2 120, and P3 130).

Two observations may aid in the development of the disclosed secure optimization protocol for vertically partitioned data. First, several popular machine learning models, such as, linear regression, ridge regression, a support vector machine (SVM) function, a least absolute shrinkage and selection operator (LASSO) function, and logistic regression, model the dependent variable y as a function of $<\theta, X>$, i.e., as a function of the inner product between the model parameters $\theta = (\theta_1, \theta_2, \ldots \theta_n)$ and the feature vector $X = (x_1, x_2, \ldots x_n)$.

For instance, in linear regression, the dependent variable y may be modeled by $h_\theta(X)$ as:

$$h_\theta(X) = <\theta, X> = \sum_{i=1}^{n} \theta_i x_i \quad (1)$$

Similarly, in logistic regression, the dependent variable y may be modeled by $h_\theta(X)$ as:

$$h_\theta(X) = \frac{1}{1 + e^{-<\theta, X>}} = \frac{1}{1 + e^{-\sum_{i=1}^{n} \theta_i x_i}} \quad (2)$$

In vertically partitioned data, the features are distributed among multiple parties. Hence, a secure sum protocol may be used to compute $<\theta, X>$.

The second observation is based on how the model parameters $\theta$ are learned from the training data. Most machine learning algorithms can be formulated as an optimization with the goal of reducing a cost function (or objective function) as shown below in Equation (3).

$$\min_{(\theta_0, \theta_1, \ldots \theta_n)} J(\theta_0, \theta_1, \ldots \theta_n) \quad (3)$$

While some optimizations may have a closed form solutions, most optimizations rely on a gradient descent technique, which often tends to be more efficient than a closed form solution, especially for large datasets.

Generally speaking, the gradient descent technique refers to a first-order iterative algorithm that searches for an optimal solution by iteratively taking steps in the direction of negative gradient in two steps as described below.

First, the gradient descent technique may initialize the model parameters $\{\theta_0, \theta_1, \ldots, \theta_n\}$. Second, until a termination criteria is satisfied, for each dimension of the model parameters $j=1, 2, \ldots, n$, update model parameter as shown in Equation (4):

$$\theta_j^{(t+1)} = \theta_j^t - \alpha \frac{\partial}{\partial \theta_j^t} J(\theta_0, \theta_1, \ldots, \theta_n) \quad (4)$$

Each step in the gradient descent technique may involve updating the model parameters based on the current gradient value. The updating operation may be terminated upon convergence. The $\alpha$ term in Equation (4) can denote the learning rate, which tends to control the rate of convergence.

Note that, for machine learning models described above (linear regression, LASSO, etc.), given $h_\theta(X)$, both the objective function J in Equation (3) and its partial derivative $$\frac{\partial J}{\partial \theta_j}$$

in Equation (4) can be computed by each party independently. As a result, given the value of $h_\theta(X)$ on training data, each party would be able to execute the gradient descent and update their model parameters independently.

In the following sections, two specific machine learning use cases are discussed to illustrate examples of how a particular analytical task may fit into the generalized framework disclosed herein.

When analyzing data, regression generally may be used to estimate relationships among variables. Specifically, it may be used to model the relationship between a dependent variable y with multiple explanatory variables (also referred to as "independent variables") that can be denoted by X. This relationship (also referred to as "model") can then be used to study how the dependent variable changes when at least one of the independent variables are varied.

Linear regression is a popular analysis tool that models the value of dependent variable y as a linear function of independent variables X. The goal of linear regression is to estimate the model parameters $\theta_j$ that best fit the training data. In linear regression, the cost function J and the parameter update operation in the gradient descent technique are given by $$J(\theta_0, \theta_1, \ldots, \theta_n) = \frac{1}{2m} \sum_{i=1}^{m} (h_\theta(X^{(i)}) - y^{(i)})^2 \quad (5)$$

$$\theta_j^{(t+1)} = \theta_j^t - \alpha \frac{1}{m} \sum_{i=1}^{m} (h_\theta(X^{(i)}) - y^{(i)}) X_j^{(i)} \quad (6)$$

where $\{X^{(i)}, y^{(i)}\}$ denote the ith training sample, and $X_j^{(i)}$ denotes the jth feature in $X^{(i)}$. Note from Equation (5) that given the value of $h_\theta(X^{(i)})$ for all training samples $i \in [1, m]$, the cost function can be evaluated by each party independently, because it is assumed that the dependent variable $y^{(i)}$ is known to all parties. Similarly, note that given the value of $h_\theta(X^{(i)})$ for all training samples, each parameter $\theta_j$ can be updated by the party that owns the jth feature. Hence, both the cost function and the update operation can be computed independently by the parties once $h_\theta(X^{(i)})$ is known, which in turn could be computed securely as described above.

Logistic regression generally refers to a regression model where the dependent variable y is categorical. In the case of a binary dependent variable, it can take two values, for example, "0" and "1," which may represent outcomes, such as, pass or fail, win or lose, alive or dead, healthy or sick, etc.

Similarly to linear regression, in logistic regression, the cost function J and the model parameter update operation in the gradient descent technique are given by $$J(\theta_0, \theta_1, \ldots, \theta_n) = \frac{1}{m}\sum_{i=1}^{m}(y^{(i)}\log(h_\epsilon(X^{(i)})) + (1-y^{(i)})\log(1-h_\theta(X^{(i)}))) \quad (7)$$

$$\theta_j^{(t+1)} = \theta_j^t - \alpha\frac{1}{m}\sum_{i=1}^{m}(h_\theta(X^{(i)}) - y^{(i)})X_j^{(i)} \quad (8)$$

Note from the above two equations that, given the value of $h_\theta(X^{(i)})$ for all training samples $i \in [1,m]$, both the cost function computation and the model parameter update operation can be performed by each participating party independently.

According to various examples, a secure solution may be used for optimization on multi-party data in a privacy-preserving fashion. The above two observations forms the foundation for a secure optimization protocol for vertically partitioned data. While the second observation shows that the optimization problem can be solved by each party once the value of $h_\theta(X)$ is computed, the first observation shows that this value $h_\theta(X)$ depends on $<\theta, X>$, which can be computed efficiently using a secure sum protocol.

Table 2 below provides a privacy-preserving multi-party optimization for a generic machine learning problem with cost function J and gradient function $$\frac{\partial J}{\partial \theta}.$$

In Table 2 below, a secure sum protocol (described above) is used as a protocol for privacy-preserving multi-party analytics. The secure sum protocol may use an untrusted mediator and leverage collusion-resistant data anonymization to protect data privacy. This protocol is secure under the honest-but-curious model and is secure to collusion attacks, as long as there are at least two honest parties.

TABLE 2

1: for i = 1, : : : , N do
2:  Pi initializes θj s for the jth attributes that belong to Pi
3:  Pi sets convergence to false
4:  Pi sets J to ∞
5: end for
6: for each gradient descent iteration until convergence is true do
7:  for i = 1, : : : , N do
8:   for r = 1, : : : , m do
9:  
$$\text{Pi computes local } h_\theta, Lh_i^r = \sum_{j=1}^{ni}\theta_i x_i \text{ for each}$$
    training sample r
10:  end for
11:  Pi shards each element in $\{Lh_i^1, Lh_i^2, \ldots Lh_i^m\}$ into two segments
12:  Pi encrypts the shards $\{Lh_i^1\}_1, \{Lh_i^1\}_2, \{Lh_i^2\}_1, \{Lh_i^2\}_2, \ldots \{Lh_i^m\}_1], [\{Lh_i^m\}_2]$ with the public keys of M, and $P_i$s in order of i = 1, . . . , N
13:  Pi sends $E[\{Lh_i^1\}_1], E[\{Lh_i^1\}_2], E[\{Lh_i^2\}_1], E[\{Lh_i^2\}_2], \ldots E[\{Lh_i^m\}_1], E[\{Lh_i^m\}_2]$ to the mediator M
14:  end for
15:  M receives $E[\{Lh_i^1\}_1], E[\{Lh_i^1\}_2], E[\{Lh_i^2\}_1], E[\{Lh_i^2\}_2], \ldots E[\{Lh_i^m\}_1], E[\{Lh_i^m\}_2]$ from all Pi
16:  M sends the encrypted shards to party $P_N$
17:  for i = N, N − 1, . . . , 2 do
18:   Pi decrypts and shuffles the shards TABLE 2-continued 19:   Pi sends the decrypted and shuffled shards to party Pi − 1
20:  end for
21:  P1 decrypts and shuffles the shards
22:  P1 sends the anonymized shards to mediator M
23:  M decrypts and extracts local $h_\theta$ for each row i = 1, . . . , m
24:  M computes $h_\theta$ for each row i = 1, . . . , m
25:  M sends $h_\theta$ values to all Pi
26:  for i = 1, : : : , N do
27:   for each dimension j that belongs to Pi do
28:  
$$\text{Pi updates } \theta_j = \theta_j - \alpha\frac{1}{m}\sum_{k=1}^{m}\frac{\partial}{\partial\theta_j}J(\theta_0, \theta_1, \ldots \theta_n | \{X^{(k)}, y^{(k)}\})$$
29:   end for
30:  end for
31:  
$$\text{Pi computes Jnew} = \frac{1}{m}\sum_{k=1}^{m}J(\theta_0, \theta_1, \ldots \theta_n | \{X^{(k)}, y^{(k)}\}),$$
    using the $h_\theta$ values
32:  if J − Jnew ≤ ε then
33:   convergence is true
34:  end if
35: end for At the end of the above protocol, each party has the final model parameters for the attributes (or features) it owns. Hence, in order to use the learned model to predict and classify any new data samples, the parties may initiate a secure sum protocol.

The secure sum protocol used herein can be replaced with other protocols. However, the secure sum protocol offers better security.

Also, although the data are sharded into two data segments in the above example for illustration purposes, the data can be shard into s segments, where s >1. Such data segmentation (or data sharding) can make the protocol robust to prior knowledge attacks. The data sharding solution can also be replaced with alternate approaches that mask the structure of the data. For example, one alternate approach could be to have the parties determine a-priori a large random number R, where each party Pi generates s random numbers $\{r_{i1}, r_{i2}, \ldots r_{is}\}$ from [−R, R] such that $\sum_{j=1}^{s}r_{ij} = Lh_i^r$. The local $h_\theta$ for all other data samples $r \in [1, m]$ can also be masked using a similar approach.

Moreover, the sequential process, in which each party decrypts the shards, shuffles them, and sends them to the next party, results in only one party being active at any given time, with the remaining N−1 parties being idle in their CPU cycles. To improve overall CPU usage, the gradient descent operation can be parallelized by using a different encryption order for each data sample. For example, rather than encrypting all local $h_\theta$ using the same encryption order, the local sum of first data sample of all parties $\{Lh_i^1\}_1, \{Lh_i^1\}_2$ may be encrypted using the parties' public keys in order i=1, . . . , N; the local sum of the second data sample $\{Lh_i^2\}_1, \{Lh_i^2\}_2$ may be encrypted using public key order i=2, . . . , N, 1; the local sum of the third data sample $\{Lh_i^3\}_1, \{Lh_i^3\}_2$ may be encrypted using public key order i=3, . . . , N, 1, 2; etc. Then, the mediator can invoke parallel decryption cycles by sending $E|\{Lh_i^1\}_1|, E|\{Lh_i^1\}_2|$ to party N first; $E|\{Lh_i^2\}_1|, E|\{Lh_i^2\}_2|$ to party 1 first, $E|\{Lh_i^3\}_1|, E|\{Lh_i^3\}_2|$ to party 2 first etc. This improves the CPU utilization of all participating parties, thereby reducing the overall execution time.

Note also that although the gradient descent technique is described in details herein, the gradient descent technique can be replaced with any other variants, such as, the mini-batch gradient descent, the stochastic gradient descent, etc. As an example, in case of the mini-batch gradient descent, the parties may decide a-priori on the batch size b. Then, each party can use a random sub-sample of size b from their data (rather than the entire data) to compute the local gradient and the cost function value. Similarly, the mediator can normalize the global gradient and global cost function value using N*b rather than m.

Finally, the linear regression analysis and the logistic regression analysis are provided here as examples only. The examples disclosed herein apply to a broad range of machine learning algorithms which model the dependent variable as a function of $<\theta, X>$, including but not limited to, a ridge regression cost function, a support vector machine (SVM) function, a least absolute shrinkage and selection operator (LASSO) function, etc.

Figure 2:
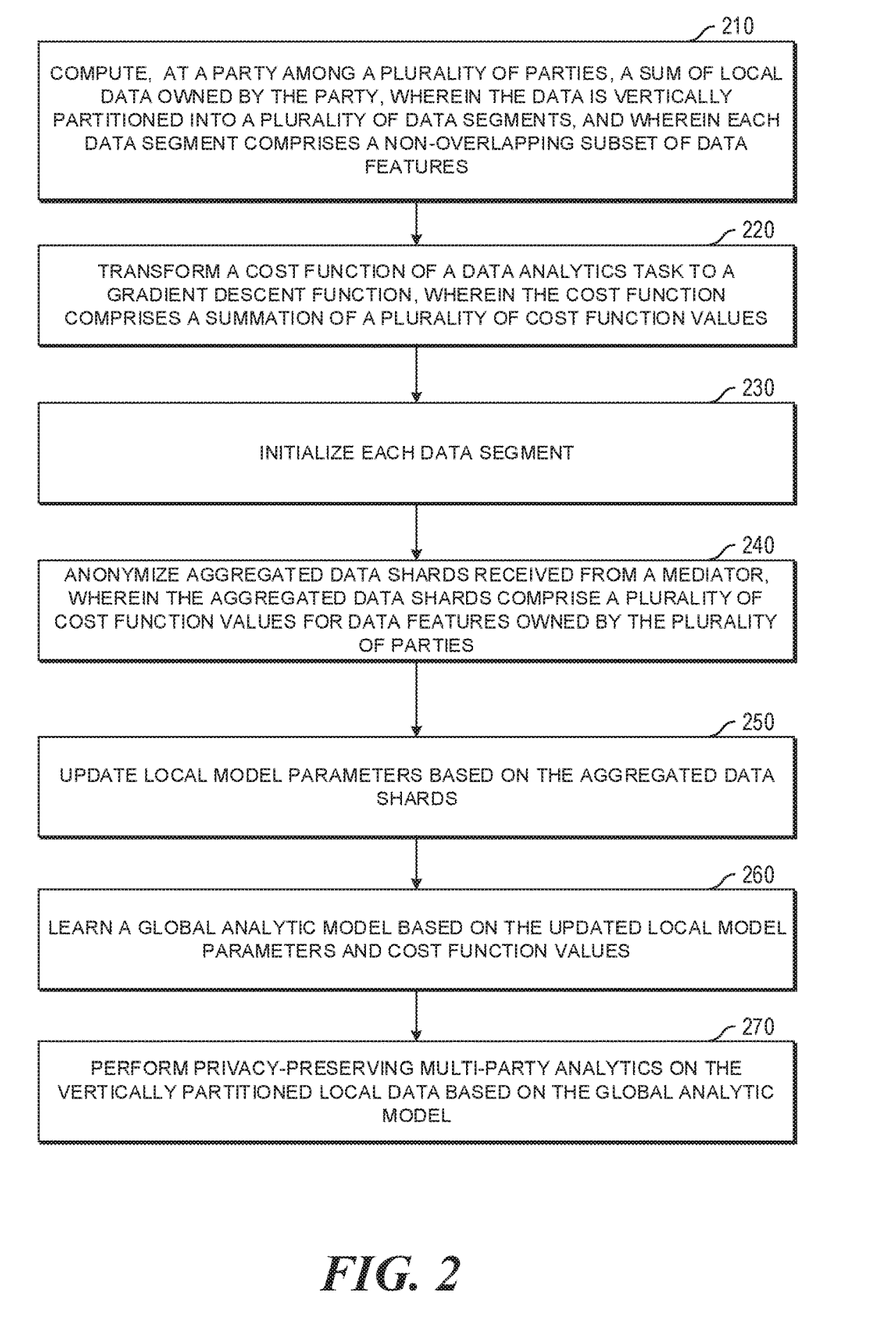
FIG. 2 is a flowchart of an example process to perform privacy-preserving multi-party analytics on vertically partitioned local data.

FIG. 2 is a flowchart of an example process for performing privacy-preserving multi-party analytics on vertically partitioned local data. During operations, a computing device can compute, at a party among a plurality of parties, a sum of local data owned by the party (operation 210). Here, the local data is vertically partitioned into a plurality of data segments, and each data segment includes a non-overlapping subset of data features. Moreover, the computing device can transform a cost function of a data analytics task to a gradient descent function (operation 220). The cost function may include a summation of a plurality of cost function values. Further, the computing device can initialize each data segment (operation 230). Thereafter, the computing device can anonymize aggregated data shards received from a mediator (operation 240). Here, the aggregated data shards may include the plurality of cost function values for data features owned by the plurality of parties. In addition, the computing device can update local model parameters based on the aggregated data shards (operation 250). Moreover, the computing device can learn a global analytic model based on the updated local model parameters and cost function values (operation 260). Finally, the computing device can perform privacy-preserving multi-party analytics on the vertically partitioned local data based on the learned global analytic model (operation 270).

In some implementations, while initializing each data segment, the computing device can divide each data segment into at least two data shards. Then, the computing device can recursively encrypt each data shard using a plurality of public keys corresponding to the plurality of parties and the mediator. Further, the computing device can share each encrypted data shard with the mediator.

In some implementations, while anonymizing the aggregated local data, the computing device can decrypt a collection of data shards received from the mediator using the private key corresponding to the first party; shuffle the collection of data shards that are decrypted using the private key corresponding to the first party; and, transmit the shuffled collection of data shards to one of the plurality of parties and the mediator. The collection of data shards can then be further decrypted using other private keys corresponding to other parties in the plurality of parties following a predetermined priority order.

In some examples, the global analytic model includes a plurality of features, each feature being associated with a particular party, and a set of features associated with the particular party has no interdependency with features associated with another party. Further, the global analytic model may include a linear relationship between a model parameter and a feature vector. In some examples, the global analytic model may include a linear regression cost function, a logistic regression cost function, a ridge regression cost function, a support vector machine (SVM) function, a least absolute shrinkage and selection operator (LASSO) function, etc.

In some examples, the plurality of parties participate in data sharing under a semi-honest adversary model, in which each party follows an agreed-upon protocol while attempting to acquire information about private data during computation.

Figure 3:
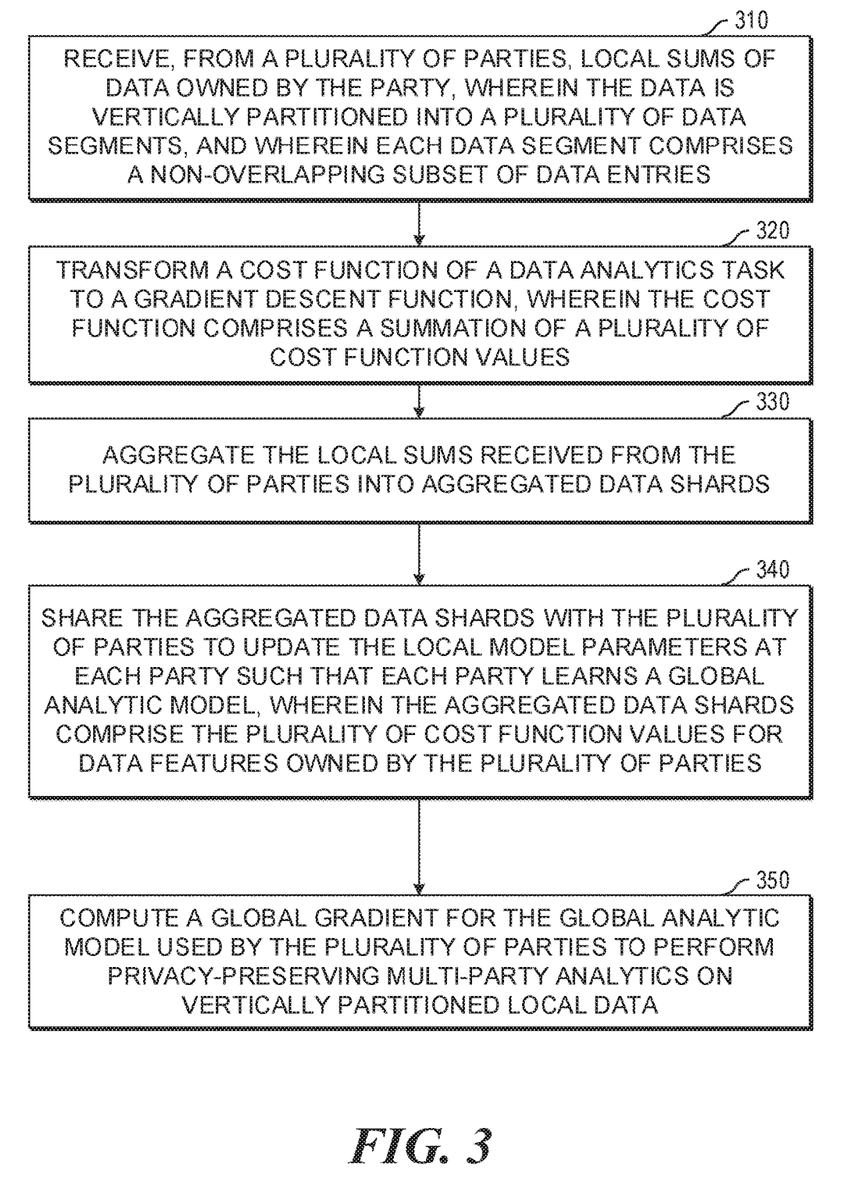
FIG. 3 is a flowchart of an example process to perform privacy-preserving multi-party analytics on vertically partitioned local data.

FIG. 3 is a flowchart of an example process for performing privacy-preserving multi-party analytics on vertically partitioned local data. During operations, a computing device may receive, from a plurality of parties, local sums of data owned by the party (operation 310). The data can be vertically partitioned into a plurality of data segments, and each data segment may include a non-overlapping subset of data features. Also, the computing device may transform a cost function of a data analytics task to a gradient descent function (operation 320). Here, the cost function may include a summation of a plurality of cost function values. Moreover, the computing device can aggregate the local sums received from the plurality of parties into aggregated data shards (operation 330). Then, the computing device can share aggregated data shards with the plurality of parties to update the local model parameters at each party (operation 340). The aggregated data shards may include the plurality of cost function values for data features owned by the plurality of parties. Each party can learn a global analytic model based on the updated local model parameters. Furthermore, the computing device may compute a global gradient for the global analytic model used by the plurality of parties to perform privacy-preserving multi-party analytics on vertically partitioned local data (operation 350).

A special purpose computer is used to perform these operations that solve the issues with data privacy rooted in computer technology given the ease with which data is stored, transported, and retrieved. The present disclosure makes improvements to the working of the computer itself by implementing these operations. Thus, the disclosed features are advances in the field of distributed secure data sharing using a non-trusted mediator.

The present disclosure also may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 4:
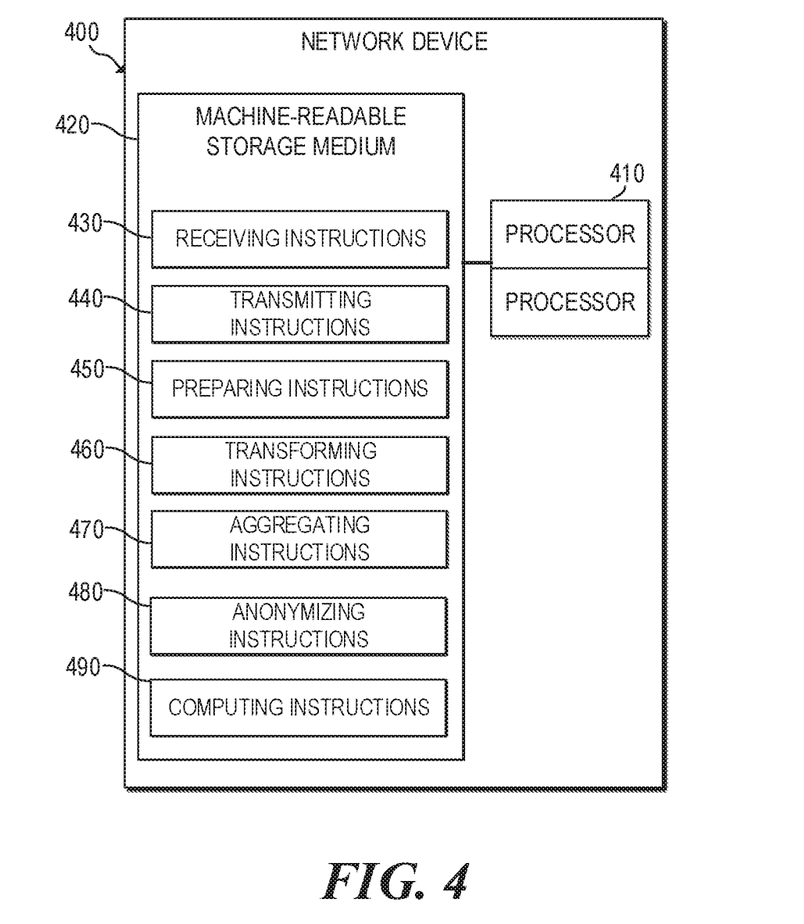
FIG. 4 is a block diagram of an example network device for performing privacy-preserving multi-party analytics on vertically partitioned data.

FIG. 4 is a block diagram of an example network device for performing privacy-preserving multi-party analytics on vertically partitioned local data. Network device 400 is generally a device suitable for performing privacy-preserving multi-party analytics on vertically partitioned local data.

As illustrated in FIG. 4, network device 400 may include one or more processors 410 and a machine-readable storage medium 420.

Processor 410 may be one or more central processing units (CPUs), CPU cores, semiconductor-based microprocessors, and/or other hardware devices suitable for retrieval and execution of instructions stored in machine-readable storage medium 420. Processor 410 may fetch, decode, and execute one or more of receiving instructions 430, transmitting instructions 440, preparing instructions 450, transforming instructions 460, aggregating instructions 470, anonymizing instructions 480, and computing instructions 490 to control the process for performing privacy-preserving multi-party analytics on vertically partitioned local data. As an alternative or in addition to retrieving and executing instructions, processor 410 may include one or more electronic circuits that include electronic components for performing the functionality of one or more of instructions 430-490.

Machine-readable storage medium 420 in network device 400 may include only a subset of instructions 430-490, depending on the role of network device 400 in the distributed system. For example, the distributed system may include two kinds of devices, e.g., parties and the non-trusted mediator. Network device 400 acting as the non-trusted mediator may not include preparing instructions 450 for preparing a data set. It may include aggregating instructions 470 for aggregating the received data set. On the other hand, network device 400 acting as a party may include preparing instructions 450. Moreover, computing instructions 490 may instruct processors 410 to perform different operations. For example, when network device 400 acts as a non-trusted mediator, computing instructions 490 may instruct processors 410 to calculate a global sum. However, when network device 400 acts as a party, computing instructions 490 may instruct processors 410 to perform local statistics computations. Therefore, the set of instructions on network devices disclosed herein may be different depending on whether an entity takes the role of a party or a mediator. In some implementations, the set of instructions can be the same on all network devices when an entity can act as both a party and a mediator.

Machine-readable storage medium 420 may be any electronic, magnetic, optical, or other physical storage device that contains or stores executable instructions. Thus, machine-readable storage medium 420 may be, for example, Random Access Memory (RAM), an Electrically Erasable Programmable Read-Only Memory (EEPROM), a storage device, an optical disc, and the like. In some implementations, machine-readable storage medium 420 may be a non-transitory storage medium, where the term "non-transitory" does not encompass transitory propagating signals.

As described in details below, non-transitory machine-readable storage medium 420 may be encoded with a series of executable instructions 430-490 to: receive, from a plurality of parties, sums of local data owned by the party, wherein the local data is vertically partitioned into a plurality of data segments, and wherein each data segment comprises a non-overlapping subset of data features; compute, at a party among a plurality of parties, a sum of local data owned by the party; transform a cost function of a data analytics task to a gradient descent function, wherein the cost function comprises a summation of a plurality of cost function values; initialize each data segment; anonymize aggregated data shards received from a mediator, wherein the aggregated data shards comprise the plurality of cost function values for data features owned by the plurality of parties; divide each data segment into at least two data shards; recursively encrypt each data shard using a plurality of public keys corresponding to the plurality of parties and a mediator; share each encrypted data shard with the mediator; decrypt a collection of data shards received from the mediator using the private key corresponding to the first party; shuffle the collection of data shards that are decrypted using the private key corresponding to the first party; transmit the shuffled collection of data shards to one of the plurality of parties and the mediator; etc.

Also, non-transitory machine-readable storage medium 420 may be encoded with a series of executable instructions 430-490 further to: aggregate the local sums received from the plurality of parties into aggregated data shards; share aggregated data shards with the plurality of parties to update the local model parameters at each party, wherein the aggregated data shards comprise the plurality of cost function values for data features owned by the plurality of parties; update local model parameters based on the aggregated data shards; learn a global analytic model based on the updated local model parameters; compute a global gradient for the global analytic model used by the plurality of parties to perform privacy-preserving multi-party analytics on the vertically partitioned local data; etc.

The foregoing disclosure describes a number of example implementations for performing privacy-preserving multi-party analytics on vertically partitioned local data. As detailed above, example implementations provide an intuitive, discoverable mechanism for performing privacy-preserving analytics across multiple parties in a multi-party environment. Additional implementations and advantages of such implementations will be apparent to those of skill in the art upon reading and understanding the foregoing description.

We claim:

1. A method comprising:
   computing, by a computing device at a party among a plurality of parties, a sum of local data owned by the party, wherein the local data is vertically partitioned into a plurality of data segments, and wherein each data segment comprises a non-overlapping subset of data features;
   transforming, by the computing device, a cost function of a data analytics task to a gradient descent function, wherein the cost function comprises a summation of a plurality of cost function values;
   initializing, by the computing device, each data segment;
   decrypting, by the computing device, a collection of data shards received from the mediator using the private key corresponding to the first party;
   shuffling, by the computing device, the collection of data shards that are decrypted using the private key corresponding to the first party;
   transmitting, by the computing device, the shuffled collection of data shards to one of the plurality of parties and the mediator;
   anonymizing, by the computing device, aggregated data shards received from a mediator, wherein the aggregated data shards comprise the plurality of cost function values for data features owned by the plurality of parties;
   updating, by the computing device, local model parameters based on the aggregated data shards;
   learning, by the computing device, a global analytic model based on the updated local parameters and cost function values; and performing, by the computing device, privacy-preserving multi-party analytics on the vertically partitioned local data based on the learned global analytic model.

2. The method of claim 1, wherein initializing each data segment comprises:
dividing, by the computing device, each data segment into at least two data shards;
recursively encrypting, by the computing device, each data shard using a plurality of public keys corresponding to the plurality of parties and a mediator; and
sharing, by the computing device, each encrypted data shard with the mediator.

3. The method of claim 1, wherein the global analytic model comprises a plurality of features, each feature being associated with a particular party, and wherein a set of features associated with the particular party has no interdependency with features associated with another party.

4. The method of claim 3, wherein the global analytic model comprises a linear relationship between a model parameter and a feature vector.

5. The method of claim 3, wherein the global analytic model comprises one of: a linear regression cost function, a logistic regression cost function, a ridge regression cost function, a support vector machine (SVM) function, and a least absolute shrinkage and selection operator (LASSO) function.

6. The method of claim 1, wherein the plurality of parties participate in data sharing under a semi-honest adversary model in which each party follows an agreed-upon protocol while attempting to acquire information about private data during computation.

7. The method of claim 1, wherein the collection of data shards is further decrypted using other private keys corresponding to other parties in the plurality of parties following a predetermined priority order.

8. A system comprising:
a plurality of computing devices associated with a plurality of parties participating in privacy-preserving data sharing under a semi-honest adversary model, and
a mediator coupled to the plurality of parties,
wherein each of the plurality of computing devices comprises a hardware processor to:
compute, at a party among a plurality of parties, a sum of local data owned by the party, wherein the local data is vertically partitioned into a plurality of data segments, and wherein each data segment comprises a non-overlapping subset of data features;
transform a cost function of a data analytics task to a gradient descent function, wherein the cost function comprises a summation of a plurality of cost function values;
initialize each data segment;
decrypt a collection of data shards received from the mediator using the private key corresponding to the first party;
shuffle the collection of data shards that are decrypted using the private key corresponding to the first party;
transmit the shuffled collection of data shards to one of the plurality of parties and the mediator;
anonymize aggregated data shards received from the mediator, wherein the aggregated data shards comprise the plurality of cost function values for data features owned by the plurality of parties;
update local model parameters based on the aggregated data shards;
learn a global analytic model based on the updated local model parameters; and
wherein the mediator computes a global gradient for the global analytic model used by the plurality of parties to perform privacy-preserving analytics on vertically partitioned local data.

9. The system of claim 8, wherein the hardware processor in each of the plurality of computing devices is further to:
divide each data segment into at least two data shards;
recursively encrypt each data shard using a plurality of public keys corresponding to the plurality of parties and a mediator; and
share each encrypted data shard with the mediator.

10. The system of claim 8, wherein the global analytic model comprises a plurality of features, each feature being associated with a particular party, and wherein a set of features associated with the particular party has no interdependency with features associated with another party.

11. The system of claim 10, wherein the global analytic model comprises a linear relationship between a model parameter and a feature vector.

12. The system of claim 10, wherein the global analytic model comprises one of: a linear regression cost function, a logistic regression cost function, a ridge regression cost function, a support vector machine (SVM) function, and a least absolute shrinkage and selection operator (LASSO) function.

13. The system of claim 8, wherein the plurality of parties participate in data sharing under a semi-honest adversary model in which each party follows an agreed-upon protocol while attempting to acquire information about private data during computation.

14. A non-transitory machine-readable storage medium encoded with instructions executable by at least one processor of a computing device associated with a mediator in a multi-party environment, the machine-readable storage medium comprising instructions to:
receive, from a plurality of parties, sums of local data owned by the party, wherein the data is vertically partitioned into a plurality of data segments, and wherein each data segment comprises a non-overlapping subset of data features;
transform a cost function of a data analytics task to a gradient descent function, wherein the cost function comprises a summation of a plurality of cost function values;
aggregate the sums received from the plurality of parties into aggregated data shards;
decrypt aggregated data shards using the private key corresponding to a first party;
shuffle the aggregated data shards that are decrypted using the private key corresponding to the first party;
transmit the shuffled collection of data shards to one of the plurality of parties and a mediator;
share the aggregated data shards with the plurality of parties to update local model parameters at each party such that each party learns a global analytic model, wherein the aggregated data shards comprise the plurality of cost function values for data features owned by the plurality of parties; and
compute a global gradient for the global analytic model used by the plurality of parties to perform privacy-preserving multi-party analytics on the vertically partitioned local data.

15. The non-transitory machine-readable storage medium of claim 14, wherein the global analytic model comprises a plurality of features, each feature being associated with a particular party, and wherein a set of features associated with the particular party has no interdependency with features associated with another party.

16. The non-transitory machine-readable storage medium of claim 15, wherein the global analytic model comprises a linear relationship between a model parameter and a feature vector.

17. The non-transitory machine-readable storage medium of claim 15, wherein the global analytic model comprises one of: a linear regression cost function, a logistic regression cost function, a ridge regression cost function, a support vector machine (SVM) function, and a least absolute shrinkage and selection operator (LASSO) function.

18. The non-transitory machine-readable storage medium of claim 14, wherein the plurality of parties participate in data sharing under a semi-honest adversary model in which each party follows an agreed-upon protocol while attempting to acquire information from private data during computation.

\* \* \* \* \*